(12) United States Patent
Takens (10) Patent No.: US 8,155,957 B1
(45) Date of Patent: Apr. 10, 2012

(54) MEDICAL TRANSCRIPTION SYSTEM INCLUDING AUTOMATED FORMATTING MEANS AND ASSOCIATED METHOD

(76) Inventor: LuAnn C. Takens, East Grand Rapids, MI (US)

(*) Notice: Subject to any disclaimer, the term of this patent is extended or adjusted under 35 U.S.C. 154(b) by 1016 days.

(21) Appl. No.: 12/075,011

(22) Filed: Mar. 7, 2008

Related U.S. Application Data

(63) Continuation-in-part of application No. 10/717,972, filed on Nov. 21, 2003, now abandoned.

(51) Int. Cl.
*G10L 15/00* (2006.01)
(52) U.S. Cl. ........ 704/235; 704/231; 369/25.01
(58) Field of Classification Search .......... 704/231, 704/235; 369/25.01
See application file for complete search history.

(56) References Cited

U.S. PATENT DOCUMENTS

| | | | | |
|---|---|---|---|---|
| 6,813,603 | B1* | 11/2004 | Groner et al. | 704/235 |
| 6,839,669 | B1* | 1/2005 | Gould et al. | 704/246 |
| 6,854,264 | B2* | 2/2005 | Elwart et al. | 60/285 |
| 6,865,258 | B1* | 3/2005 | Polcyn | 379/88.01 |
| 2002/0143533 | A1* | 10/2002 | Lucas et al. | 704/235 |
| 2003/0212554 | A1* | 11/2003 | Vatland | 704/235 |
| 2005/0096910 | A1* | 5/2005 | Watson et al. | 704/260 |
| 2005/0102146 | A1* | 5/2005 | Lucas et al. | 704/270 |
| 2007/0225978 | A1* | 9/2007 | Wolfe et al. | 704/235 |
| 2008/0015857 | A1* | 1/2008 | Pearah et al. | 704/235 |

* cited by examiner

*Primary Examiner* — Daniel D Abebe (57) ABSTRACT

An automated transcription system includes an housing on a PC, and a portable electronic device including a mechanism for creating and managing a plurality of predetermined templates with a plurality of headings and sub-headings that are automatically populated in real time as a user speaks an audio message. The portable electronic device further includes a mechanism for converting and displaying the audio message to a text message on the portable electronic device and thereby enabling a user to read, edit and print the text message. Such an audio message converting and displaying mechanism includes an LCD screen, a microphone for receiving the audio message when the user speaks, and a data transfer interface.

9 Claims, 4 Drawing Sheets

MEDICAL TRANSCRIPTION SYSTEM INCLUDING AUTOMATED FORMATTING MEANS AND ASSOCIATED METHOD

CROSS REFERENCE TO RELATED APPLICATIONS

This application is a continuation-in-part application of U.S. patent application Ser. No. 10/717,972, filed on Nov. 21, 2003 now abandoned, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a hand-held recording device and, more particularly, to a hand-held recording device including means for automatically converting and formatting audio messages to text messages.

2. Prior Art

Records management is a critical function for modern organizations. It is a particularly critical function for hospitals, users' offices, and other health care facilities because accurate and complete records are vital to the proper treatment of a patient. Users, nurses, and other health care workers often document various procedures by using a dictation device. The dictated material must eventually be transcribed.

However, because a health care worker's hands must be used to perform certain procedures, dictation is not always possible and the healthcare worker must rely on his or her memory to transcribe the events at a later time. Any such delay in documenting a procedure can compromise the accuracy and detail thereof. Furthermore, such delays are often to be expected, as distractions, such as medical emergencies, are commonly encountered. The accuracy of such documentation can be crucial, however, particularly when the quality of the medical care becomes the subject of litigation.

In addition, health care workers often must ordinarily carry paper and/or forms on which certain patient information is immediately documented. Transporting and handling such documents is inconvenient. It is therefore apparent that health care workers need to conveniently, accurately, and thoroughly document medical procedures during the performance thereof.

Accordingly, a need remains for a device that digitally records and formats speech so that the speech may be automatically transcribed using voice recognition software.

BRIEF SUMMARY OF THE INVENTION

In view of the foregoing background, it is therefore an object of the present invention to provide a device for recording medical transcriptions. These and other objects, features, and advantages of the invention are provided by a medical transcription system.

The automated transcription system 10 includes an housing on a PC (not shown). The system further includes a portable electronic device including a mechanism for creating and managing a plurality of predetermined templates with a plurality of headings and sub-headings that are automatically populated in real time as a user speaks an audio message. Such a template creating and managing mechanism effectively includes a processor and a memory electrically coupled to the processor.

Such a memory includes a software program application that causes the automated transcription system to conveniently execute a control logic algorithm including the steps of: requesting the user to speak a first command; displaying a corresponding one of the templates based upon recognition of the spoken first command; prompting the user to beginning dictating the audio message; verifying whether corresponding headings and subheadings have been populated; if a corresponding one of the headings and subheadings has not been populated; automatically parsing the audio message and automatically populating the corresponding one of the headings and subheadings in real time; repeating these steps until all of the headings and subheadings have been automatically populated in the template in real time; and notifying a user when all of the headings and subheadings have been automatically populated. The software program application further includes a mechanism for converting a text message from a first language to a second language in real time as the user speaks.

The portable electronic device further includes a mechanism for advantageously converting and displaying the audio message to a text message on the portable electronic device and thereby enabling a user to read, edit and print the text message. Such an audio message converting and displaying mechanism includes an LCD screen disposed on the housing for visually displaying a current operating mode of the system as well as the text message in real time as the user speaks. The mechanism further includes a microphone for receiving the audio message when the user speaks, and a data transfer interface electrically coupled directly to the microphone for receiving and parsing the audio message into corresponding alphanumerical characters.

The portable electronic device further includes a user interface with a plurality of control buttons for effectively toggling the automated transcription system between alternate operating modes, and a power source is electrically coupled to the user interface.

A method for utilizing an automatic transcription system includes the steps of: providing a portable electronic device; automatically populating a plurality of headings and sub-headings in real time as a user speaks an audio message by creating and managing a plurality of predetermined templates; and enabling a user to read, edit and print the text message by converting and displaying the audio message to a text message on the portable electronic device.

The method further includes the steps of: providing a processor; and providing a memory electrically coupled to the processor. The memory includes a software program application that causes the automated transcription system to execute a control logic algorithm including the steps of: requesting the user to speak a first command; displaying a corresponding one of the templates based upon recognition of the spoken first command; prompting the user to beginning dictating the audio message; verifying whether corresponding headings and subheadings have been populated; if a corresponding one of the headings and subheadings has not been populated, automatically parsing the audio message and automatically populating the corresponding one of the headings and subheadings in real time; repeating these steps until all of the headings and subheadings have been automatically populated in the template in real time; and notifying a user when all of the headings and subheadings have been automatically populated.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
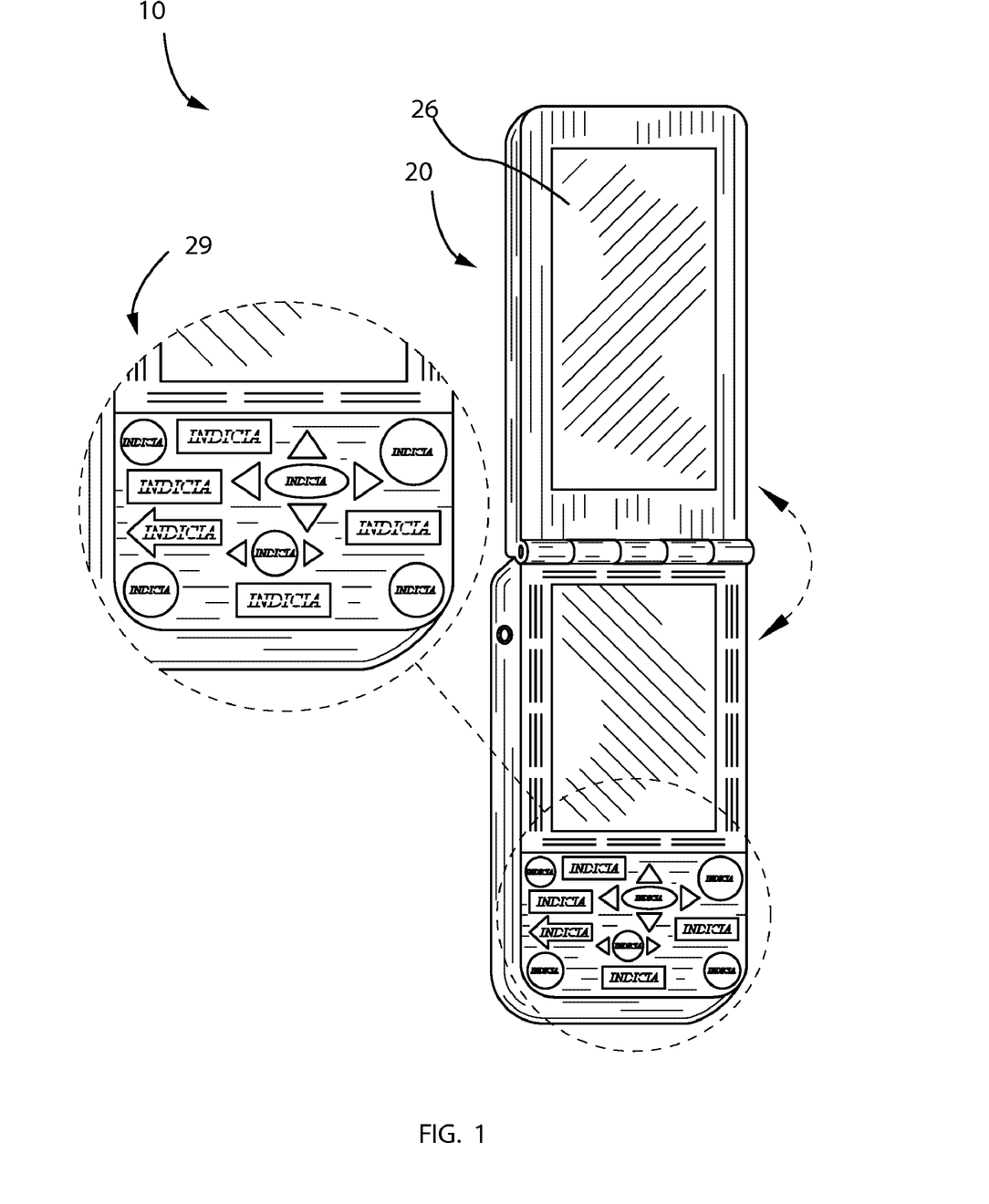
FIG. 1 is a perspective view showing a portable electronic device for automatically recording, converting and formatting medical transcriptions in real time, in accordance with the present invention, wherein the control buttons displayed on the portable electronic device are enlarged for clarity.
Figure 2:
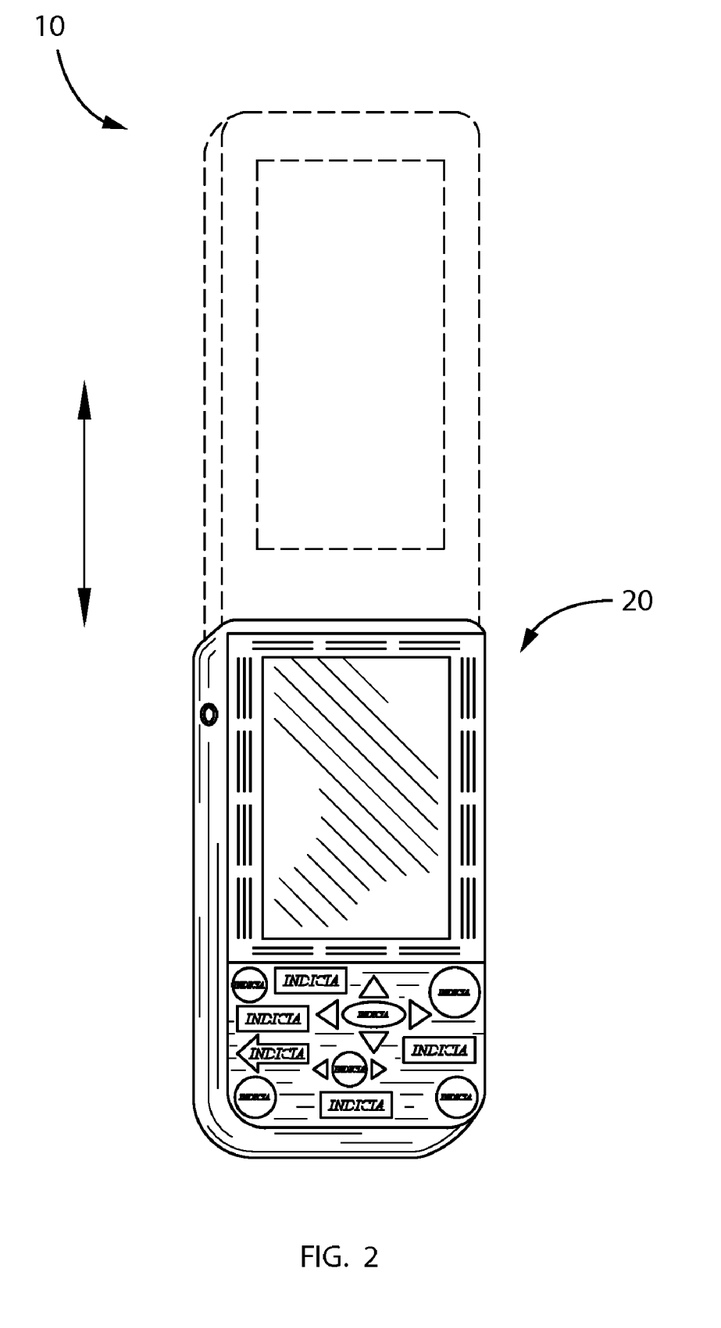
FIG. 2 is perspective view of the portable electronic device.
Figure 3:
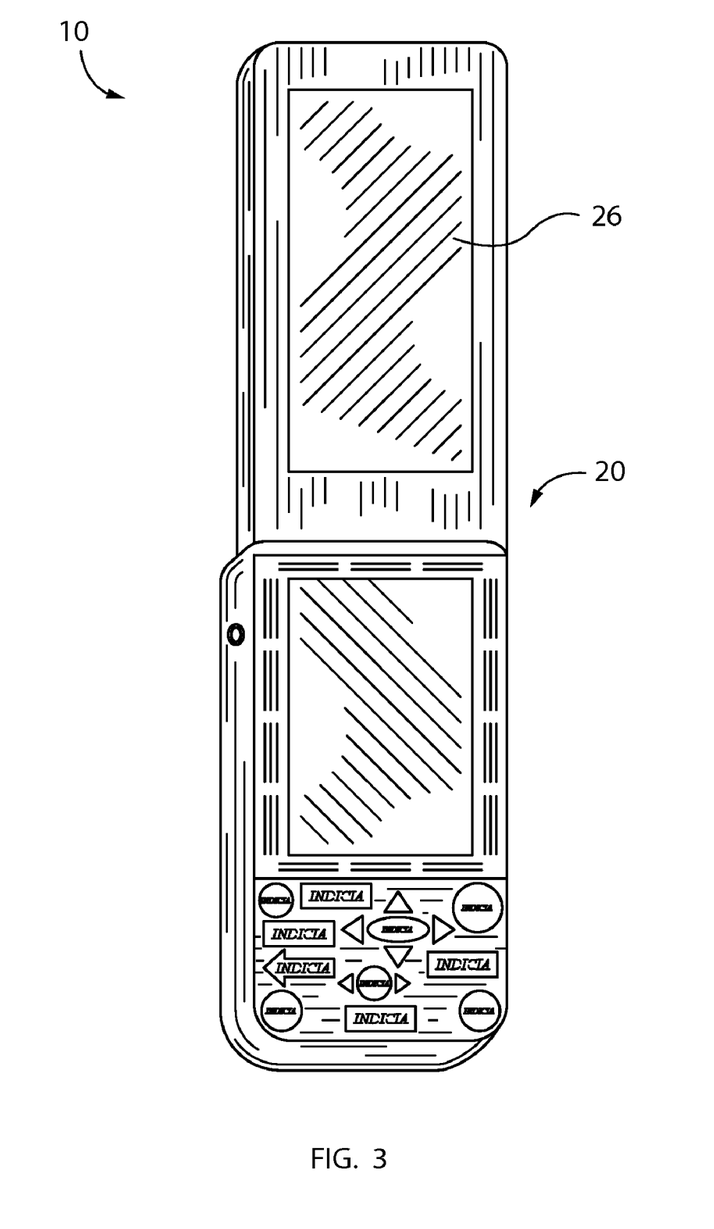
FIG. 3 is yet another perspective view of portable electronic device.

The system of this invention is referred to generally in FIGS. 1-3 by the reference numeral 10 and is intended to provide a system for recording medical transcriptions. It should be understood that the system 10 may be used for many different types of recordings and should not be limited to only medical transcriptions.

Initially referring to FIGS. 1-4, an automated transcription system 10 includes an housing on a PC (not shown). The system 10 further includes a portable electronic device 20 including a mechanism 21 for creating and managing a plurality of predetermined templates with a plurality of headings and sub-headings that are automatically populated in real time as a user speaks an audio message. Such a template creating and managing mechanism 21 includes a processor 22 and a memory 23 electrically coupled to the processor 22.

Figure 4:
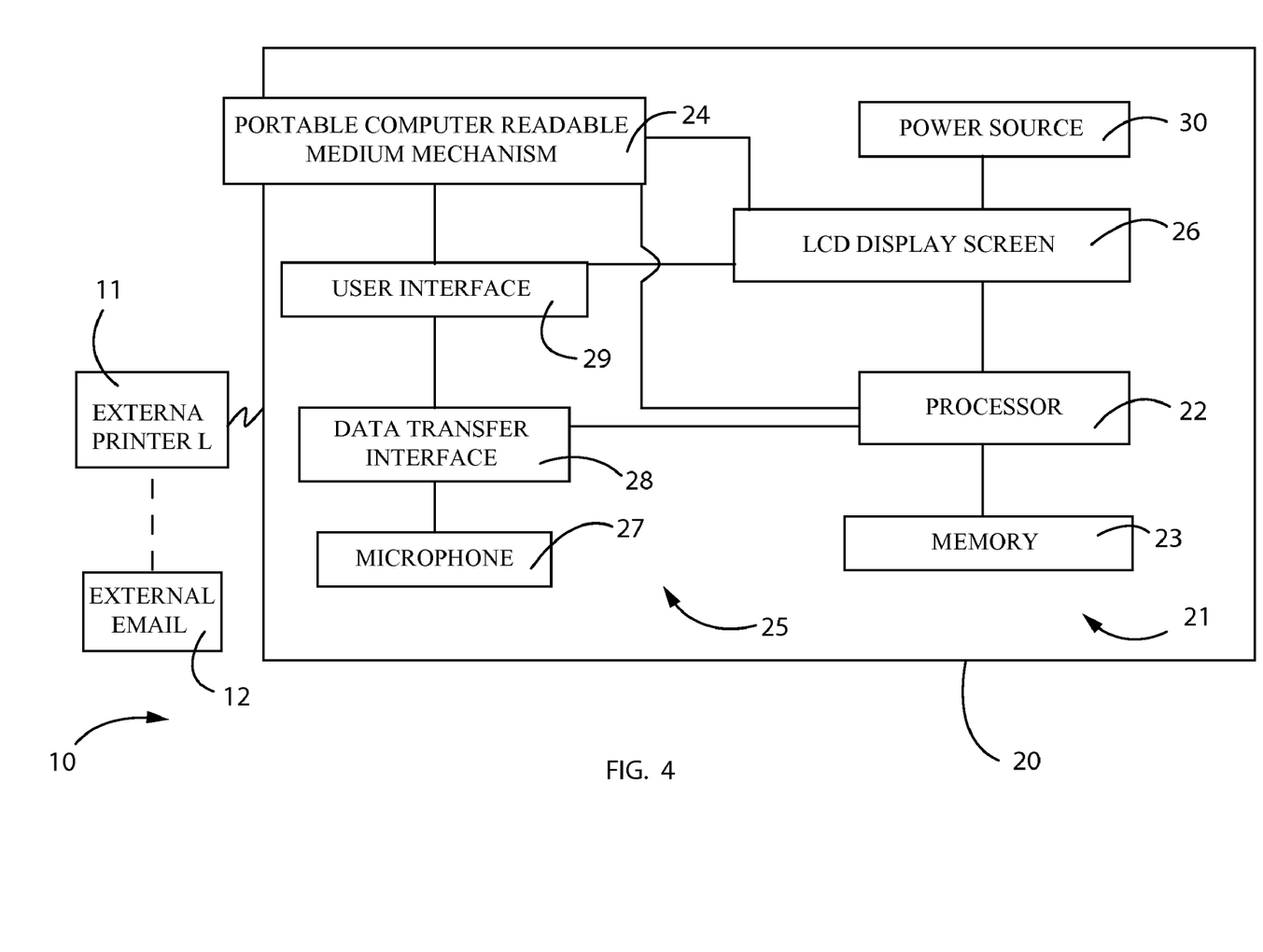
FIG. 4 is a schematic block diagram showing the interrelationship between the major electronic components of the present invention.

Such a memory 23 includes a software program application that causes the automated transcription system 10 to execute a control logic algorithm including the steps of: requesting the user to speak a first command; displaying a corresponding one of the templates based upon recognition of the spoken first command; prompting the user to beginning dictating the audio message; verifying whether corresponding headings and subheadings have been populated; if a corresponding one of the headings and subheadings has not been populated; automatically parsing the audio message and automatically populating the corresponding one of the headings and subheadings in real time; repeating these steps until all of the headings and subheadings have been automatically populated in the template in real time; and notifying a user when all of the headings and subheadings have been automatically populated. The software program application further includes a mechanism 24 for converting a text message from a first language to a second language in real time as the user speaks.

The portable electronic device 20 further includes a mechanism 25 for converting and displaying the audio message to a text message on the portable electronic device 20 and thereby enabling a user to read, edit and print the text message. Such an audio message converting and displaying mechanism 25 includes an LCD screen 26 disposed on the housing for visually displaying a current operating mode of the system as well as the text message in real time as the user speaks. The mechanism 25 further includes a microphone 27 for receiving the audio message when the user speaks, and a data transfer interface 28 electrically coupled directly to the microphone 27 for receiving and parsing the audio message into corresponding alphanumerical characters.

The portable electronic device 20 further includes a user interface 29 with a plurality of control buttons for toggling the automated transcription system 10 between alternate operating modes, and a power source 30 is electrically coupled to the user interface 29.

A method for utilizing an automatic transcription system 10 includes the steps of: providing a portable electronic device 20; automatically populating a plurality of headings and sub-headings in real time as a user speaks an audio message by creating and managing a plurality of predetermined templates; and enabling a user to read, edit and print the text message by converting and displaying the audio message to a text message on the portable electronic device 20.

The method further includes the steps of: providing a processor; and providing a memory electrically coupled to the processor. The memory includes a software program application that causes the automated transcription system to execute a control logic algorithm including the steps of: requesting the user to speak a first command; displaying a corresponding one of the templates based upon recognition of the spoken first command; prompting the user to beginning dictating the audio message; verifying whether corresponding headings and subheadings have been populated; if a corresponding one of the headings and subheadings has not been populated, automatically parsing the audio message and automatically populating the corresponding one of the headings and subheadings in real time; repeating these steps until all of the headings and subheadings have been automatically populated in the template in real time; and notifying a user when all of the headings and subheadings have been automatically populated.

The use of portable computer readable medium provides a vital back-up function for information storage at a low cost when compared to the use of flash memory cards. While the system 10 is preferably used for medical transcription, the program application could be adapted for use in many specialty fields, including, but not limited to, legal, psychiatry, dermatology, gynecology, education and business.

When used in conjunction with one of any number of PC voice transcription software packages available, the cost and complexity of text transcription is substantially reduced. The program application further includes a mechanism for converting a text message from a first language to a second language. This enables a user to record multi-lingual conversations and allows the system to be marketed around the world.

The system 10 enables medical professionals to perform medical transcription conveniently and cost effectively. As a result, the system 10 eliminates the added expense of hiring a professional transcriptionist and ensures that reports are done quickly and accurately. In addition, the system 10 is PC compatible for easy downloading and processing information.

The system may be rectangular in shape, and may include speakers that surround the face of the portable electronic device. The portable electronic device 20 may include a snap in the back of the portable electronic device, thereby providing a stand. This may allow the user to stand the portable electronic device 20 up to dictate if he/she so chooses. The portable electronic device 20 may further include a belt clip on the back of the portable electronic device as well as for allowing the user to hook the device on his/her clothing. The present invention may also have a cradle on the wall for supporting the device in an alternative fashion. A hand-held microphone, a hands-free clip-on microphone and/or a head-set type fashion microphone may be employed to receive the user's dictation.

The portable electronic device 20 may have either a flip-open LCD screen (similar to a cell phone flip open design), or a LCD screen that pulls out from the top or the side of the portable electronic device when it is in use. The LCD screen is preferably incorporated with the main face of the portable electronic device 20. The LCD screen automatically displays an audible report in text format as it is being created, and may be viewed by a user (physician or other professional) while he/she is dictating (please see below for sample reports). For example, the software program application prompts the user to identify a type of report he/she is dictating; i.e. History and Physical Examination. In response to the user's command, the software program application automatically displays an appropriate template on the LCD screen. The selected template has preformatted headings and subheadings that prompts the user to input appropriate information pertaining to the type of report selected by the user. Next, the software program application automatically populates each respective heading and subheading when the user speaks in real time. For example, when the user speaks the patient's name, the software program application automatically populates the patient's name and the patient number on the LCD screen in real time. Advantageously, the user spoken information automatically appears in subsequent headings and subheadings in an order displayed on the LCD screen just as if a transcriptionist was manually inputting the user's audio message into the headings and subheadings.

In a preferred embodiment, the software program application may automatically input the heading in real time and then continue with the report and automatically input subsequent information as the user dictates information through the microphone in real time. Next area of the report to be inputted, for example, may be the CHIEF COMPLAINT. The user may then speak and the information regarding the chief complaint may automatically appear on the LCD screen in real time. Next the software program application skips to a next heading or subheading of the report, such as HISTORY OF PRESENT ILLNESS, and the report continues to be inputted until it is automatically completed in real time. When the report is completed, the user can say "End Report," and the software program application may automatically add a signature line and the user's name. Finally, the software program application may automatically enter to the date and the user's initials.

In an alternate embodiment, the present invention may further include a menu feature that allows many options to pop up on the LCD screen, such as selecting a preferred style or color font for the report. Further, the present invention may enable a user to attach or view existing current x-rays or chart notes directly to the report. The portable electronic device may further include a choice of languages for which a user may report and may further include the ability to flip the report into another language once it was created. An email option may be included which may show a keyboard on the LCD screen to allow the user to touch the email address and thereby send it to a remote location or, in an alternate embodiment, the portable electronic device 20 itself may include a keyboard directly on the main face thereof. The menu may also include an option to choose which type of report the user may like to complete, such as Medical, Legal, Reporter, or Teacher, etc., and shall not be limited. It may also include specific reports within any given field or profession.

The menu may include additional features as well. For example, a speed bar may control the speed that each heading and subheading is populated on the report, as may be heard in the "say" mode. The "say" mode may say headings and subheadings as the report is being created. A "save to computer" feature may enable a user to store the file for download or to directly send the report to an external computer or printer. The menu feature may create an easy-to-use menu of information. For example, by moving the directions of the arrows on a menu button, a user can select which topic he/she wants displayed on the LCD screen.

When a user is ready to use the portable electronic device 20 for dictation purposes, the user may simply press the "dictation" button and begin to dictate a report. The "print" button may be pressed to send the report directly to the printer 11. The "view" button may be pressed for viewing a report, and displaying its current format. A "volume" button may turn up or down the volume of the portable electronic device 20. The "delete" button may delete the entire report, enabling a user to start over. A "back to" button may take the user to the previous subheadings or heading. The "rewind" button may take the user to the beginning of the report. A "power" button may turn the portable electronic device on or off. A "pause" button may be provided for pausing the device during dictation. A "fast forward" button may enable a user to move forward in a report. Other buttons could be added to the menu as needed for convenience. The device may be compatible with any number of computer programs and devices such as CD-RW, memory sticks, flash cards, and/or computer chips. The present invention may also be compatible with a user's cell phone, blackberry, or other mobile device so that data can be directly transferred to and from the portable electronic device.

The present invention houses all the necessary software program applications and electronic components inside the hand-held portable electronic device 20, which has a plurality of headings/subheadings data built into (predetermined) templates that are populated automatically, in real time, as a user speaks. Such processes happen instantly or in real time during the actual user dictation (creating a user-friendly sequence of data). This helps the user keep information in the report in a correct flow so that the headings/subheadings automatically populate in a correct sequence on the LCD screen just as if a transcriptionist was manually populating the headings/subheadings after the user dictated the report. The present invention may also include a "say mode" if the user chooses to hear the automatic population of the heading/sub-heading (report creation). Alternately, a "screen mode" may be activated discontinue the sound and thereby allow the user to observe the automatic population on the flip-up or pull-out LCD screen. Also, there would be a mode to allow the user to do both (see the creation on the LCD screen and also hear the headings/sub-headings being said during creation of the report in real time).

The present invention discloses a hand-held device that performs all the needed functions of the automatic population of the headings/subheadings, and no computer is needed. The portable electronic device has the capability to send a completed report directly to a printer without requiring a computer. The heading/sub-heading information automatically populates on the LCD as the report is being created; i.e., the user speaks. Further, the present invention not only places the heading/sub-heading information in the correct order of the particular type of report, but also puts the report in the correct placement on the screen (correct placement as on a piece of paper so that the same will be printed on the printer). The portable hand-held electronic device 20 does not have to be in communication with a PC in order to create the entire report or put it in the correct flow of information.

Instant or "automatic" populating of the heading and sub-heading data is enabled during the actual dictation of the report by the user. For example, if the user is completing a history and physical examination report, then only that correct flow of headings and sub-headings will be "populating automatically" as the user is talking. To further demonstrate, the user may say: "This is Dr. Stephen Dalm, patient number 040502 (Joe Smith populates automatically) . . . . This is a [history/physical examination] . . . " From here, the software program application automatically populates the correct heading in the correct placement on the template. Then the device populates to the left side of the sub-heading of information (pertaining again to only this type of report). The user sees this on the flip-up screen and continues by adding his free-flow text to go with this heading. Also, the present invention may include a "say mode" that will repeat the heading/sub-heading information to the user so he may not constantly have to look at the flip-up screen. This flip-up screen may resemble a cell phone flip-up design, similar to a portable electronic device 20, but geared towards a particular profession.

All of the necessary software program application is contained in the handheld or clip-on version of the portable electronic device 20 versus using a software program on a PC. This software may include, but is not limited to, software which may check medical spelling, punctuation, and terminology. However, a computer option should be available to a user in order to save the dictated information. The hand-held electronic device may also send the completed report to another user or remote location by email 12. The device may further enable a user to pull the most current and/or past x-rays/charts/notes to the report if the user desires or just wants to use it for viewing purposes.

The device may further include a pull out keyboard for utilization when a user does not wish to verbally dictate a report. The report would be typed in real time. In addition, the menu could include an option to have the certain email locations saved in order to make sending an email very simple, if emails are frequently sent to a certain location if the user needs to send a report to referring physicians, law firms, insurance companies, etc. Further, the control buttons on the device could include a button such as "Skip" for skipping to the next sub-header.

The prior art may teach other methods for which a medical transcriptionist does reports, while with this device, a transcriptionist is not needed. The device will be beneficial in saving money for the user because there will be no need for a transcriptionist. Also, present invention may be geared to other professions such as lawyers, business people, teachers, reporters, etc. The device may be beneficial to anyone who could use an easy to follow report system that gets it done quickly and accurately.

Sample report templates with headings/subheadings are listed below.

Sample Discharge Summary 1

Mary Charles DISCHARGE SUMMARY
040303
Dr. Sung Pak

Discharge Summary

ADMITTING DIAGNOSIS: Intrauterine gestation, at term in active labor.
HISTORY OF PRESENT ILLNESS: The patient is a 14-year-old gravida 1 para 0, who was presented in active labor without prior prenatal care.
LABORATORY FINDINGS: Urine culture positive for *Escherichia coli*. Lochia culture negative for aerobic and anaerobic cultures.
HOSPITAL COURSE: Spontaneous vaginal delivery produced a viable male infant weighing 3,450 gm with Apgar scores of 7 at five minutes and 9 at ten minutes. Twenty portable electronic devices of Pitocin were administered postpartum. No Tocolysis was administered. The delivery was complicated by the presence of a Nuchal cord, which probably accounted for the early low Apgar scores. Four plus Meconium was present. The pediatrician attended to the neonate postpartum. Following normal vaginal delivery of a viable infant, the placenta was delivered intact. Three cord vessels were identified. Cord blood samples were sent to Pathology. A midline episiotomy was performed for the delivery after using local anesthesia. Two days postpartum, the patient developed a temperature of 105° F. with dysuria and a foul lochia. On Gantrisin, patient defervesced and dysuria resolved.
DISPOSITION: Discharged to home with infant.
FOLLOW-UP: Return in two weeks for repeat urine culture and in six weeks for routine postpartum care.
CONDITION ON DISCHARGE: Stable.
DISCHARGE DIAGNOSIS: 1. Normal spontaneous vaginal delivery with midline episiotomy.

Sample Discharge Summary 2

Mary Charles DISCHARGE SUMMARY
040303
Dr. Sung Pak Page 2
2. Cystitis. Puerperal infection not evident at the present time.
PLAN: Repeat clean-void urine culture and lochia culture in two weeks. Tubal ligation had been planned but will be deferred until this infection is completely resolved.
DISCHARGE MEDICATIONS: None.

---

Sung Pak, M.D.
D: 11-5-01
T: 11-6-01
SP: lct

Sample History and Physical Examination Report 1

Jesus Marin HISTORY AND PHYSICAL EXAMINATION
040502
Dr. Sansuk Sudsai

History

CHIEF COMPLAINT: Rash and respiratory distress.

HISTORY OF PRESENT ILLNESS: This is an 11-month-old Hispanic male who was diagnosed with measles nine days ago at another hospital. He also had Otitis Media at that time and was begun on Ampicillin. He continued to have daily fever and decreased appetite. He began to have a cough yesterday with increasing respiratory distress yesterday evening.
PAST HISTORY:
IMMUNIZATONS: UTD.
MEDICATIONS: Ampicillin and Tylenol.
ILLNESSES: No history of mumps or chickenpox.
OPERATIONS: No previous hospitalizations or surgery.
ALLERGIES: NO KNOWN ALLERGIES.
FAMILY HISTORY: Three older siblings. Measles exposure via cousin.

Physical Examination

GENERAL: Patient in severe respiratory distress. Unable to cry.
VITAL SIGNS:
PULSE: 160.
RESPIRATORY RATE: 56.
TEMPERATURE: 100.1 F.
HEENT:
HEAD: Normocephalic. Atraumatic.
EYES: PR. EOMs intact.
EARS: TMs red bilaterally.
NOSE: Yellow crusting over nose.
NECK: Supple without adenopathy.

Sample History and Physical Examination Report 2

Jesus Marin HISTORY AND PHYSICAL EXAMINATION
040502
Dr. Sansuk Sudsai Page 2
CHEST:
HEART: Regular rate and rhythm without murmurs.
LUNGS: Poor air movement. Respiratory stridor. No wheezing. Intercostal and suprasternal retraction. There are a few crackles in the bases. No rhonchi or areas of consolidation.
ABDOMEN: Soft without hepatomegaly. The liver is 1-2 cm below the right costal margin.
GENITALIA: Normal male genitalia.
EXTREMITIES: No edema or cyanosis. The skin is mottled with a multifocal maculopapular rash.
NEUROLOGIC: Without focal deficit. Alert.
IMPRESSION: 1. Measles.
  2. Bilateral otitis media.
  3. Respiratory distress, suspect laryngotracheobronchitis.
PLAN: 1. Begin IV ampicillin and IV aminophylline.
  2. Begin 30% oxygen mist with nebulizer.
  3. Begin Decadron.
  4. Chest x-ray, CBC, white blood cells with differential, electrolytes.

Sansuk Sudsai, M.D.
D: 1-31-02
T: 2-1-02
SS: lct

Sample Operative Report 1

Anna Carter OPERATIVE REPORT
050101 Date of Operation:
Surgeon: R. Snow, M.D. Jan. 6, 2002
Assistant Surgeon: A. Jones, M.D. Department: General Surgery Operative Report PREOPERATIVE DIAGNOSIS: Right breast adenocarcinoma.
POSTOPERATIVE DIAGNOSIS: Right breast adenocarcinoma.
PRIMARY PROCEDURE: RIGHT MODIFIED RADICAL MASTECTOMY.
ANESTHESIA: General endotracheal.
PROCEDURE: The patient was prepped and draped in the usual sterile fashion. The skin was sharply incised in an elliptical fashion around the right breast, encompassing the nipple and the mass. Skin flaps were raised superiorly and inferiorly with electrocautery. This was carried down to and through the pectoralis muscle fascia. The breast was then removed from the pectoralis muscle including the fascia, starting medially with electrocautery. Once the breast was reflected laterally, the axillary vein was identified. The long thoracic and thoracodorsal nerves were also identified and preserved. The axillary contents between the two nerves and inferior to the axillary vein were then removed with sharp dissection. Hemoclips were used where needed. The entire breast and axillary contents were removed en bloc. The apex of the axilla was marked with a single silk ligature. This was then passed off and filed, and Pathology was called in to examine the specimen. The wound was then checked for hemostasis, and no active bleeding was found. Two Jackson-Pratt drains were placed, one to the axilla and one to the anterior aspect of the wound. These were brought out through separate stab incisions inferiorly. The skin was then closed with skin staples. Estimated blood loss: 75 cc. Sponge and needle counts were correct ×2 at the end of the procedure. The patient tolerated the procedure well. There were no complications. The patient was extubated in the operating room and sent to the Postanesthesia Recovery Room in stable condition.

Robert Snow, M.D.
D: 1-5-02
T: 1-6-02
RS: lct

Sample Psychiatric Report 1

Sharon LaPalma PSYCHIATRIC CONSULTATION REPORT
040604
Dr. Sansuk Sudsai

Consultation Report

REASON FOR REFERRAL: The patient is a 43-year-old Caucasian female with a master's degree, who recently left her apartment and is presently homeless. She has worked as an MFCC and teacher in the past. She was brought in by the River City Police after exhibiting bizarre behavior in the restaurant, refusing to leave when asked to do so by the management.
HISTORY OF PRESENT ILLNESS: The patient has a long history of psychiatric illness with symptoms of both mood disorder and of bipolar disorder in the past. Most recent diagnosis was bipolar disorder, manic. The patient has been in Weston Hospital twice in 1989 and also in Orange Harbor Hospital twice this year on 72-hour hold for bizarre behavior.

The reasons for previous admission resemble remarkable reasons for this admission. On the day of admission, the patient was in a sushi restaurant. She found it necessary, because of what she calls extreme heat, to go to the bathroom, disrobe, soak her clothes in the sink and put the clothing back on and return to the restaurant. The restaurant owners said that she had been there all day already, and as it was 4:30 p.m., they asked her to leave. She refused to do so, and police were called. She was violent with the police and was brought to the psychiatric emergency area.

PHYSICAL EXAMINATION:

GENERAL: The patient had a physical exam, which revealed no acute physical findings.

NEUROLOGIC: Mental status exam was significant only for certain degree of unkempt appearance, perhaps secondary to her being soaking wet, and a hostile affect and very irritable mood. Also, remarkable in her mental status exam was her claim that she was actually the result of genetic manipulation by Plutonian scientists and that she had come to Earth from that planet. The patient was given an initial diagnosis of Sample Psychiatric Report 2

Sharon LaPalma PSYCHIATRIC CONSULTATION REPORT
040604
Dr. Sansuk Sudsai Page 2
psychosis NOS, rule out bipolar disorder, rule out schizoaffective disorder and was admitted.
ASSESSMENT: AXIS I Psychosis or Organic Disease: Bipolar disorder, manic. Ethanol abuse.
AXIS II Personality Disorder: None.
AXIS III Medical Condition or Diseases: None.
AXIS IV Psychosocial Stressor Level: Mild.
AXIS V Global Assessment of Function Scale: 15. Six-month projection 40, 12-month projection, 40. Past year 60.
RECOMMENDATIONS: Thorazine 100 mg p.o. b.i.d. and 200 mg p.o. h.s.

Sansuk Sudsai, M.D.
D: 2-8-02
T: 2-9-02
SS: Ict

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automated transcription system comprising:
a portable electronic device comprising
means for creating and managing a plurality of predetermined templates having a plurality of headings and sub-headings that are automatically populated in real time as a user speaks an audio message, and
means for converting and displaying said audio message to a text message on said portable electronic device and thereby enabling a user to read, edit and print said text message;
wherein said template creating and managing means comprises
a processor;
a memory electrically coupled to said processor, said memory including a software program application that causes said automated transcription system to execute a control logic algorithm including the steps of:
a. requesting the user to speak a first command,
b. displaying a corresponding one of said templates based upon recognition of said spoken first command,
c. prompting the user to beginning dictating said audio message,
d. verifying whether corresponding headings and subheadings have been populated,
e. if a corresponding one of said headings and subheadings has not been populated, automatically parsing said audio message and automatically populating said corresponding one of said headings and subheadings in real time,
f. repeating steps a.-e. until all of said headings and subheadings have been automatically populated in said template in real time, and
g. notifying a user when all of said headings and subheadings have been automatically populated.

2. The automated transcription system of claim 1, wherein said audio message converting and displaying means comprises:
an LCD screen disposed on said housing for visually displaying a current operating mode of said system as well as said text message in real time as the user speaks;
a microphone for receiving said audio message when the user speaks; and
a data transfer interface electrically coupled directly to said microphone for receiving and parsing said audio message into corresponding alphanumerical characters.

3. The automated transcription system of claim 1, wherein said software program application further comprises: means for converting a text message from a first language to a second language in real time as the user speaks.

4. The automated transcription system of claim 1, wherein said portable electronic device further comprises:
a user interface having a plurality of control buttons for toggling said automated transcription system between alternate operating modes; and
a power source electrically coupled to said user interface.

5. An automated transcription system comprising:
a portable hand-held electronic device comprising
means for creating and managing a plurality of predetermined templates having a plurality of headings and sub-headings that are automatically populated in real time as a user speaks an audio message, and
means for converting and displaying said audio message to a text message on said portable electronic device and thereby enabling a user to read, edit and print said text message;
wherein said template creating and managing means comprises:
a processor;
a memory electrically coupled to said processor, said memory including a software program application that causes said automated transcription system to execute a control logic algorithm including the steps of:
a. requesting the user to speak a first command, b. displaying a corresponding one of said templates based upon recognition of said spoken first command, c. prompting the user to beginning dictating said audio message, d. verifying whether corresponding headings and subheadings have been populated, e. if a corresponding one of said headings and subheadings has not been populated, automatically parsing said audio message and automatically populating said corresponding one of said headings and subheadings in real time, f. repeating steps a.-e. until all of said headings and subheadings have been automatically populated in said template in real time, and g. notifying a user when all of said headings and subheadings have been automatically populated.

6. The automated transcription system of claim 5, wherein said audio message converting and displaying means comprises:

an LCD screen disposed on said housing for visually displaying a current operating mode of said system as well as said text message in real time as the user speaks;

a microphone for receiving said audio message when the user speaks; and a data transfer interface electrically coupled directly to said microphone for receiving and parsing said audio message into corresponding alphanumerical characters.

7. The automated transcription system of claim 5, wherein said software program application further comprises: means for converting a text message from a first language to a second language in real time as the user speaks.

8. The automated transcription system of claim 5, wherein said portable electronic device further comprises:

a user interface having a plurality of control buttons for toggling said automated transcription system between alternate operating modes; and a power source electrically coupled to said user interface.

9. A method for utilizing an automatic transcription system, said method comprising the steps of:

a. providing a portable electronic device;

b. automatically populated a plurality of headings and subheadings in real time as a user speaks an audio message by creating and managing a plurality of predetermined templates; and c. enabling a user to read, edit and print said text message by converting and displaying said audio message to a text message on said portable electronic device;

wherein step b. comprises the steps of:

providing a processor;

providing a memory electrically coupled to said processor, said memory including a software program application that causes said automated transcription system to execute a control logic algorithm including the steps of:

a. requesting the user to speak a first command, b. displaying a corresponding one of said templates based upon recognition of said spoken first command, c. prompting the user to beginning dictating said audio message, d. verifying whether corresponding headings and subheadings have been populated, e. if a corresponding one of said headings and subheadings has not been populated, automatically parsing said audio message and automatically populating said corresponding one of said headings and subheadings in real time, f. repeating steps a.-e. until all of said headings and subheadings have been automatically populated in said template in real time, and g. notifying a user when all of said headings and subheadings have been automatically populated.

* * * * *